United States Patent [19]
*Bainbridge et al.

[11] Patent Number: 5,766,395
[45] Date of Patent: Jun. 16, 1998

[54] METHOD OF MAKING SELF-SUPPORTING COMPOSITE STRUCTURES

[75] Inventors: David William Bainbridge; Mario Peter Tocci, both of Littleton, Colo.; Larry Maxwell Bauman, Defiance, Ohio

[73] Assignee: Johns Manville International, Inc., Denver, Colo.

[ * ] Notice: The term of this patent shall not extend beyond the expiration date of Pat. No. 5,503,903.

[21] Appl. No.: 520,219

[22] Filed: Aug. 28, 1995

[51] Int. Cl.$^6$ .................. B27N 5/00; B29C 51/00; B32B 31/20
[52] U.S. Cl. .................. 156/222; 156/307.1; 156/309.6; 264/113; 264/119; 264/122; 264/241; 264/257
[58] Field of Search .................. 156/62.2, 221, 156/245, 307.1, 308.2, 334, 335, 309.6, 222, 224; 181/290, 291, 294; 296/214; 264/112, 113, 119, 122, 128, 241, 257; 428/248, 249, 264, 296, 297, 326, 351

[56] References Cited

U.S. PATENT DOCUMENTS

| | | | |
|---|---|---|---|
| 3,704,199 | 11/1972 | Smucker | 156/335 |
| 4,150,186 | 4/1979 | Kazama | 296/214 |
| 4,379,808 | 4/1983 | Cole et al. | 156/196 |
| 4,418,031 | 11/1983 | Doerer et al. | 264/241 |
| 4,474,846 | 10/1984 | Doerer et al. | 428/284 |
| 4,613,627 | 9/1986 | Sherman et al. | 521/68 |
| 5,057,166 | 10/1991 | Young, Sr. et al. | 156/62.2 |
| 5,082,605 | 1/1992 | Brooks et al. | 264/122 |
| 5,443,691 | 8/1995 | Phan et al. | 162/115 |
| 5,494,737 | 2/1996 | Sakai et al. | 428/317.9 |
| 5,503,903 | 4/1996 | Bainbridge et al. | 428/182 |

FOREIGN PATENT DOCUMENTS

| | | |
|---|---|---|
| 644085 | 3/1995 | European Pat. Off. |
| 1147991 | 12/1957 | France . |
| 80 08 248 | 4/1980 | France . |

*Primary Examiner*—Richard Crispino
*Attorney, Agent, or Firm*—Robert D. Touslee

[57] ABSTRACT

A molded, self-supporting, composite part or panel for automotive and similar applications comprises a vapor impervious wood fiber filled polymeric (preferably polypropylene) sheet adhered to one major face of a corrugated paperboard medium and a layer of fibrous insulation (preferably glass fiber) or a second wood fiber filled polymeric sheet adhered to a second major face of the corrugated paperboard medium. The sheet and corrugated medium provide the structural strength for the composite and the fibrous insulation, when used, provides the composite with good sound absorption properties. The wood fiber filled polymeric sheet is formed during the molding process from a wood and polymeric fiber sheet. The heat and pressure of the molding process cause the polymeric fibers to melt and flow about the wood fibers to form the wood fiber filled sheet and bond the sheet securely to the corrugated medium. A thermoset binder can be used in the sheet to strengthen the composite and help the composite retain its molded shape prior to cooling. Uncured binder in the fibrous insulation is cured during the molding process to bond the fibrous insulation to the corrugated medium.

14 Claims, 1 Drawing Sheet

METHOD OF MAKING SELF-SUPPORTING COMPOSITE STRUCTURES

BACKGROUND OF THE INVENTION

The present invention relates to trim materials, panels and similar components for automotive and similar applications, such as but not limited to, roof liners, hood liners, trunk liners, package trays, dash insulators, door panels and other interior and under the hood components, and in particular, to self supporting trim materials, panels and similar components.

The interior surface of an automotive roof is commonly covered or lined with a trim material or panel which presents an attractive appearance and also acts as a sound absorber. Molded glass fiber and foam liners are examples of such liners. Basically, these products adequately perform the functions for which they were designed, but they are too expensive to be used in economy automobiles. Economy automobiles require a liner that is not only attractive and sound absorbing, but one which is less costly.

One of the materials designers considered when confronted with the need to produce an inexpensive shaped product, such as a roof liner, is wood fibers. Wood fibers are readily available, inexpensive and can be formed into various hardboard shapes by a variety of manufacturing techniques. Hardboard roof liners and the like have been manufactured from wood fiber mats formed from an aqueous slurry. A wood fiber mat is placed in a mold where resins in the wood fiber mat enable the mat to be compressed to a higher density and shaped under heat and pressure. However, this product is too heavy; is difficult to mold; and has poor acoustical properties.

Other attempts to produce light, low cost roof liners involved forming the roof liners from two paperboard facers with a corrugated paperboard medium sandwiched between the paperboard facers. While inexpensive, these roof liners lack adequate sound absorption properties and are difficult to form, without cracking, into the dished shape required for roof liner panels and the like.

U.S. Pat. Nos. 4,886,696 and 5,057,176, disclose a corrugated paperboard automotive roof liner which has solved many of the problems associated with the previously discussed automotive roof liners. The roof liner disclosed in these patents is self supporting, inexpensive and exhibits surprisingly good sound absorption properties. While the roof liner of the '696 and the '176 patents performs very well, the unique, self-supporting composite part of the present invention, which is preferably formed from a sheet comprising polyolefin and wood fibers and a binder, a corrugated medium and a fibrous insulation blanket or a second sheet, provides an inexpensive, superior performing trim material for roof liners, hood liners, trunk liners, dash insulators, door panels and the like.

SUMMARY OF THE INVENTION

In one embodiment of the self-supporting, composite, part (e.g. trim materials, panels and similar components) of the present invention, the strength of a single faced corrugated sheet is combined with the sound absorption qualities of a fibrous insulation. The single faced corrugated sheet forms the backing for the part and comprises a vapor impervious, wood fiber filled polyolefin, preferably polypropylene, backing sheet and a corrugated paperboard medium. A layer of fibrous insulation, preferably a glass fiber insulation blanket, is adhered to the corrugated medium and in a roof liner, forms the facing which is exposed to the interior of the vehicle for appearance and sound absorption.

In the manufacture of this self-supporting, composite part of the present invention, a corrugated paperboard medium is located between a sheet of polyolefin and wood fibers and an uncured layer of fibrous insulation. The resulting laminate is placed in a heated mold and shaped under heat and pressure. As the laminate is shaped in the mold under heat and pressure, the polyolefin fibers in the sheet melt and flow around the wood fibers thereby transforming the sheet into a wood fiber filled polyolefin sheet; the sheet conforms to the molding surface of the mold; and the sheet is firmly bonded, at least in part by the polyolefin material of the sheet, to a first major surface of the corrugated medium. At the same time, the outer surface of the fibrous insulation layer conforms to the shape of the molding surface of the mold and the binder in the fibrous insulation is cured so that the fibrous insulation layer retains this shape and the fibrous insulation layer is bonded to a second major surface of the corrugated medium.

To facilitate the formation of the composite part from the laminate, the wood and polyolefin fiber sheet preferably includes a binder within the sheet which cures and sets during the formation of the composite part in the heated mold. By having such a binder incorporated into the wood and polyolefin fiber sheet, the sheet exhibits a higher tear strength during the molding operation and the composite part being molded will retain its shape upon being removed from the mold without having to be cooled.

The composite part of the present invention forms a trim material, panel or similar component which is inexpensive. The component, e.g. a roof liner, is self-supporting and has greater strength than the glass fiber or paperboard roof liners discussed above in the background of the invention. For example, one roof liner panel of the present invention can be used to line the roof of a van which previously required three separate roof liner sections to line the roof.

When used as a roof liner panel, the single faced corrugated backing sheet, formed during the molding of the self-supporting, composite structure of the present invention provides the roof liner panel with good sound transmission loss properties while the fibrous insulation layer of the composite structure provides the roof liner panel with good sound absorption properties. Since the single faced corrugated backing sheet provides the strength for the composite structure, "pillowed" areas can be used in the fibrous insulation layer, for greater sound absorption, without compromising the strength of the roof liner panel. The provision of "pillowed" areas in previous roof liners, made solely of glass fiber, compromised the strength of such liners.

In the molding process, the polyolefin fibers in the backing sheet melt and the uncured binder in the fibrous insulation cures to act as adhesives to firmly bond the sheet and the fibrous insulation layer to the major surfaces of the corrugated medium. Thus, the need to apply separate adhesives to the layers of the laminate to firmly bond the laminate together is eliminated.

In a second embodiment of the composite part of the present invention, a first wood and polyolefin fiber sheet with a binder is bonded to a first major surface of a corrugated medium and a second sheet, such as but not limited to, a wood and polyolefin fiber sheet with or without binder is bonded to the second major surface of the corrugated medium instead of the fibrous insulation layer. In the preferred form of this embodiment, the second sheet is a wood and polyolefin fiber sheet containing a binder of the type used in the first sheet bonded to the first major surface of the corrugated medium.

DESCRIPTION OF THE PREFERRED EMBODIMENTS

Various trim materials, panels, components or parts, such as but not limited to, hood liners, trunk liners, package trays, dash insulators, door panels and the like, could be used to illustrate the self-supporting, composite structure of the present invention and the method of making the self-supporting composite structure. However, a roof liner panel will be used to illustrate the self-supporting, composite part of the present invention and the method of making the same.

Figure 1:
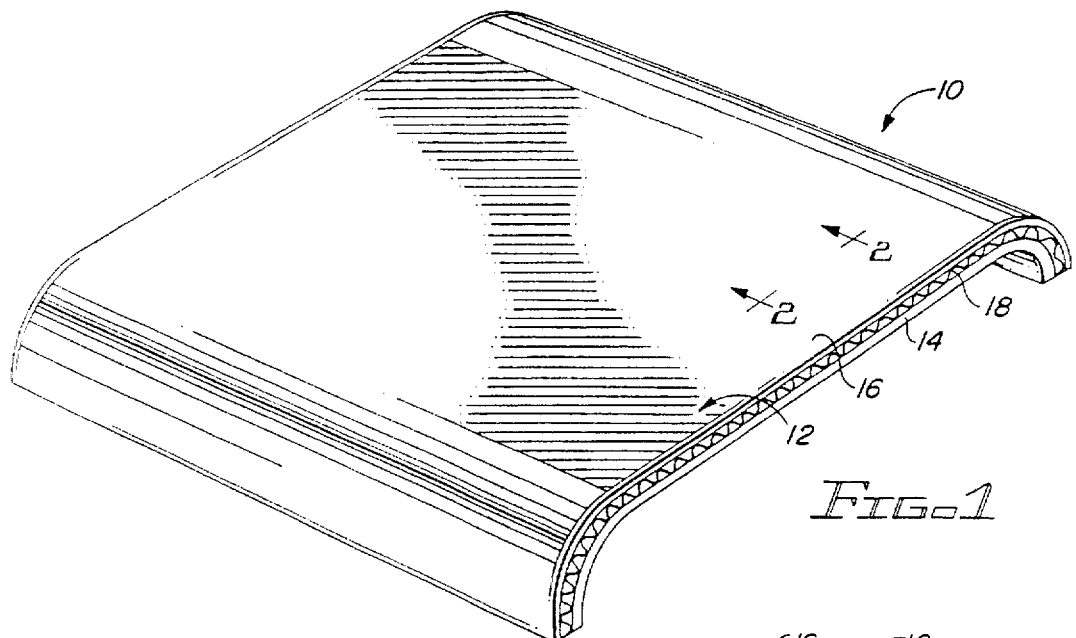
FIG. 1 is a perspective view of an automotive roof liner panel of the present invention.

FIG. 1 shows a self-supporting automotive roof liner panel 10 of the present invention which comprises a single-faced corrugated backing sheet 12 and a glass fiber facing layer 14. The roof liner panel 10 is shaped to conform to the interior surface of an automotive roof with a convex surface of the roof liner being installed adjacent the roof of the vehicle and the concave surface of the roof liner being exposed to the interior of the vehicle. The roof liner panel may be installed in a vehicle by any of a variety of methods which generally utilize clips or other attachment devices. Since the methods of attaching roof liner panels to the roofs of vehicles and other trim parts or panels to vehicles are well known in the art and form no part of the present invention, the attachment devices are not shown.

Figure 2:
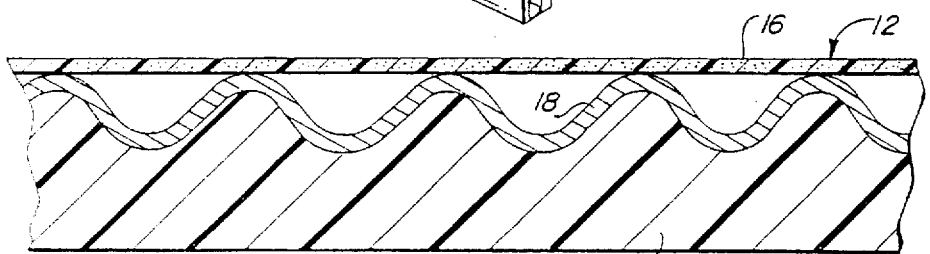
FIG. 2 is an enlarged partial section of the roof liner panel taken substantially along lines 2—2 of FIG. 1.

As best shown in FIG. 2, the self-supporting roof liner panel 10 of the present invention is a composite structure with a single faced corrugated backing sheet 12 that is installed in a vehicle adjacent or against the interior surface of the vehicle roof and a fibrous insulation, such as polyester fiber or preferably glass fiber insulation, or a high temperature foam, such as polyimide foam, facing layer 14 which is exposed to the interior of the vehicle. The single faced corrugated backing sheet 12 provides the structural strength of the composite structure and the fibrous insulation facing layer 14 provides the sound absorbing properties of the composite structure.

The single faced corrugated backing sheet 12 comprises a vapor impervious, wood fiber filled polyolefin, preferably polypropylene, sheet 16 with a corrugated paperboard medium 18 adhered thereto. The caliper of the wood fiber filled polyolefin sheet 16 is preferably between 18 and 35 points.

When no binder is used in the wood and polyolefin fiber sheet which is transformed into the wood fiber filled polyolefin sheet 16 in the molding operation of the present invention, the wood and polyolefin fiber sheet typically comprises between 60% and 75% by weight wood fibers and between 25% and 40% by weight polyolefin fibers and preferably, about 65% by weight wood fibers and about 35% by weight polyolefin fibers. However, for certain applications, the wood and polyolefin fiber sheet can range from about 50% to 90% by weight wood fibers and from about 10% to about 50% by weight polyolefin fibers.

When a binder is used in the wood and polyolefin fiber sheet which is transformed into the wood fiber filled polyolefin sheet 16 during the molding operation of the present invention, the wood and polyolefin fiber sheet typically comprises between 50% and 60% by weight wood fibers, between 25% and 40% by weight polyolefin fibers and between 5% and 25% by weight binder and preferably, about 55% by weight wood fibers, about 30% by weight polyolefin fibers and about 15% by weight binder. However, the wood and polyolefin fiber sheet can comprise between 50% and 90% by weight wood fibers, between 10% and 50% by weight polyolefin fibers, and between 1% and 30% by weight binder. The binder is a thermoset binder, a latex emulsion binder or a thermoset and latex emulsion binder blend. As indicated above, the preferred polyolefin material of the fibers is polypropylene.

The preferred wood pulp fiber is a long, soft bleached southern pine which has been found to work better than short or hard wood fibers. The longer fibers function to decrease the density of the sheet by creating loft. This causes the sheet to conform more readily to the contour of the mold surface when the laminate is being molded into the composite, self-supporting roof liner panel 10. In addition, the longer length, soft bleached, southern pine fibers improve the tear strength of the sheet 16 due to the greater entanglement of the longer fibers with surrounding fibers. The long southern pine fibers are between about 50 and 150 microns long and have diameters ranging from 20 to 60 microns and preferably from 30 to 50 microns. In addition, to southern pine fibers, other long, soft wood fibers can also be used in the sheet 16.

The average diameter of the polyolefin fibers (e.g. polypropylene fibers or polyester fibers) used in the wood and polyolefin fiber sheet is typically between 1 and 8 microns and preferably between 1 and 4 microns. As with the wood fibers, the average length of the polyolefin fibers is between about 50 and 150 microns. However, for highly contoured parts, where a higher tear strength is required for the sheet, polyolefin fibers ranging in diameter from 1 to 15 denier and in length from 0.25 to 1.50 inches can be substituted for the finer diameter polyolefin fibers totally or in part.

When the thermoset binder is added to the wood and polyolefin fiber sheet, the thermoset binder causes the wood fiber filled polyolefin sheet 16 formed during the molding operation, and thus the composite roof liner panel 10, to retain its molded shape, without cooling, upon removal from the mold in the molding process. When used in the wood and polyolefin fiber sheet, the binder is added to the wood and polyolefin fibers in the hydropulper. By adding alum to the aqueous mixture and adjusting the pH of the aqueous mixture in the hydropulper to a pH between 4.0 and 4.5 or by adding a deposition aid, such as an acid, to the aqueous mixture, the binder is precipitated out and onto the fibers. The binder comprises between 1% and 30% by weight of the wood and polyolefin fiber sheet. An example of a binder which can be used in the wood and polyolefin fiber sheet is a thermoset resin binder primarily composed of a polycarboxylic salt and sold by Rohm and Haas under the trademark HF-05 resin.

The thermoset binder used in the wood and polyolefin fiber sheet does not cure at the temperatures (e.g. 250° F.) required to laminate the sheet to the corrugated medium 18. When desired, this enables the wood and polyolefin fiber sheet and the corrugated medium 18 to be bonded together in a conventional heated corrugation machine prior to being introduced into a mold, using starch or some other suitable adhesive material, to facilitate handling of the sheet and the corrugated medium 18. Preferably, the thermoset binder used in the wood and polyolefin fiber sheet can be "B staged" at the temperatures, used in the formation of the wood and polyolefin fiber sheet, driving off all or substantially all of the moisture in the wood and polyolefin fiber sheet during the sheet forming operation to greatly improve the tensile properties of the wood and polyolefin fiber sheet. Thus, in the preferred embodiment of the invention, the preferred thermoset binder used in the wood and polyolefin fiber sheet not only cures and sets at the molding temperatures so that the part formed from the sheet can be immediately removed from the mold without cooling and still retain its molded shape, but also greatly improves the tensile strength of the wood and polyolefin fiber sheet to facilitate the formation of A single faced or double faced corrugated backing sheet to be used in the molding operation.

Testing was conducted to demonstrate the additional tensile strength imparted to the wood and polyolefin fiber sheet, used to form the composite structure of the present invention, and the wood fiber filled, polyolefin sheet 16, formed during the molding operation, by the addition of the thermoset binder. The wood and polyolefin fiber sheet was formed in accordance with the procedure set forth above and comprised 55% by weight wood fibers; 35% by weight polypropylene fibers with a melt temperature of 280° Fahrenheit and 10% by weight HF-05 thermoset binder. Three sample groups were used to evaluate the performance of the sheet incorporating the binder. In a first group, the wood and polypropylene fiber sheet was tested as manufactured and the result of the tensile test was 5.85 lbs/inch. In a second group, the sheet was pressed at 300° Fahrenheit and at 200 psi for 5 minutes and the result of the tensile test was 9.3 lbs/inch. In a third group, the sheet was first pressed at 300° Fahrenheit at 200 psi for 5 minutes and then cured at 450° Fahrenheit for 30 seconds and the result of the tensile test was 27.75 lbs/inch. The tests show that the use of the thermoset binder in the sheet improved the tensile properties of the wood and polypropylene fiber sheet used to form the single or double faced corrugated backing sheet and greatly improved the tensile properties of the wood fiber filled polypropylene sheet 16, formed from the wood and polypropylene fiber sheet, at the temperatures used to mold the self-supporting, composite roof liner panels and other trim parts and components of the present invention.

In another embodiment of the present invention, the binder used in the wood and polyolefin fiber sheet comprises either a blend of a latex emulsion binder and the thermoset resin binder described above, with the latex emulsion binder being substituted, in part, for the thermoset resin binder, or the latex emulsion binder is completely substituted for the thermoset resin binder. While it is contemplated that other latex emulsions can be used in the binder of the wood and polyolefin fiber sheet, one latex emulsion binder that performs well in the wood and polyolefin fiber sheet of the present invention is a vinyl acetate homopolymer, such as the "Resyn CP 8100" latex emulsion. As with the thermoset binder, the latex emulsion binder is added to the wood and polyolefin fibers in the hydropulper and deposited on the fibers.

The substitution of the latex emulsion binder for part of the thermoset binder, imparts an improved tensile strength to the wood and polyolefin fiber sheet, prior to and while the water is being driven from the sheet by the "B staging" of the thermoset binder, to both improve the pull through strength of the sheet when the sheet is being applied to the corrugated medium 18 in the corrugation machine prior to the molding operation and the tear strength of the sheet during the molding operation. As stated above, the percentage of binder in the wood and polyolefin fiber sheet ranges from 1% to 30% by weight and the percentage of the latex emulsion in the binder of the sheet can range from 0 to 100%. Typically, the amount of latex emulsion used in the binder blend is increased and the amount of thermoset binder in the binder blend is decreased as the parts being molded become more highly contoured to prevent separation of the part being molded in the highly contoured areas of the part. For some highly contoured parts, the binder used in the sheet consists solely of the latex emulsion and the large diameter polyolefin fibers (i.e. 1 to 15 denier) are substituted at least in part for the finer diameter polyolefin fibers to provide the part with the tear strength necessary to conform to the highly contoured molding surface.

In addition to providing structural strength to the composite self-supporting roof liner panel 10, the wood fiber filled polyolefin sheet 16 formed by the method of the present invention also functions as a vapor barrier for the roof liner panel 10 and prevents condensation from the metal vehicle roof from penetrating into the roof liner. This property eliminates the need for a separate vapor barrier in the composite roof liner and reduces the cost of the roof liner panel 10.

The corrugated paperboard medium 18 used in the self-supporting roof liner panel 10 is preferably a C flute which is 141 mils thick and contains 39 flutes per foot. The corrugated paperboard medium 18 is preferably between 30 and 40 pounds per 1000 square feet of medium.

The fibrous insulation facing layer 14 is preferably a glass fiber insulation blanket having an uncured resin binder and a density of between 4 and 10 pounds per cubic foot. The fibrous insulation layer 14 preferably ranges in thickness from ⅛ of an inch to 1½ inches. Since the corrugated backing sheet 12 comprising the sheet 16 and the corrugated medium 18 provide the structural strength of the composite roof liner panel 10, portions of the fibrous insulation layer 14 can be formed at a lower density for better sound absorption without adversely affecting the strength of the roof liner. Previously, these "pillowed" areas posed a problem in molded glass fiber roof liners where the reduction in the density of the glass fiber panel weakened the panel.

Figure 3:
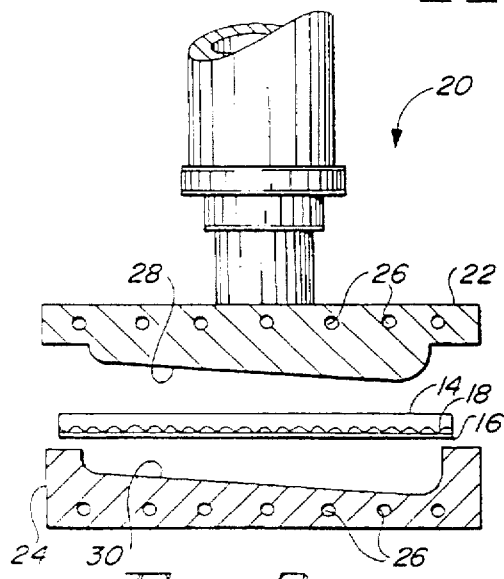
FIG. 3 is a schematic section of a laminate of the present invention being placed in a heated mold to be shaped into a composite trim material, panel or similar component such as a roof liner panel.

The self-supporting composite roof liner panel 10 is formed in a molding process. FIG. 3 shows a heated press 20 comprising a male mold member 22 and a female mold member 24. Both mold members contain heating units 26, such as electrical heaters or hot oil lines which maintain the non-planar, male and female press surfaces 28 and 30, respectively, at a predetermined molding temperature. The molding temperature for this process ranges from 350° to about 570° Fahrenheit. The curing time in the press 20 for the laminate will vary depending on the density of the fibrous insulation used to form the facing layer 14.

Figure 4:
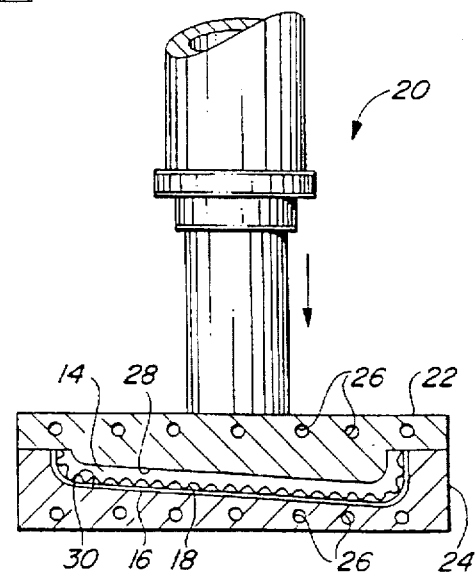
FIG. 4 is a schematic section of the laminate of FIG. 3 being shaped under heat and pressure to form a composite trim material, panel or similar component such as a roof liner panel.

As shown in FIGS. 3 and 4, the self-supporting roof liner panel 10 is formed by locating the wood and polyolefin fiber sheet, the corrugated paperboard medium 18 and the layer 14 of uncured fibrous insulation (e.g. glass fiber insulation with an uncured phenolic resin binder) in the mold 20 with the corrugated medium between the wood and polyolefin fiber sheet and the fibrous layer 14. The press 20 is then closed as shown in FIG. 4, by bringing the male and female mold members together. The heat and pressure causes the polyolefin fibers in the wood and polyolefin fiber sheet to melt and flow around the wood fibers, as the sheet conforms to the configuration of the molding surface 30 of the mold 20, to transform the wood and polyolefin fiber sheet into a vapor impervious, wood fiber filled polyolefin sheet. In addition, the polyolefin material also acts as an adhesive to firmly bond the corrugated paperboard medium 18 to the sheet 16 and form the corrugated backing sheet 12 which provides the structural strength of the composite roof liner panel 10 formed by the method of the present invention.

Simultaneously, the binder in the fibrous insulation layer 14 is being cured and the fibrous insulation layer is being conformed to the molding surface 28 of the mold 20. As the binder, e.g. a phenolic resin in the glass fiber insulation, is cured, the binder functions as an adhesive to firmly bond the fibrous insulation layer 14 to the corrugated paperboard medium 18 of the corrugated backing sheet 12. When the fibrous insulation layer 14 is cured, the formed, self-supporting roof liner is removed from the press 20.

When a thermoset binder is incorporated into the wood and polyolefin fiber sheet, the thermoset binder sets during the molding process and the wood fiber filled polyolefin sheet formed during the molding process retains its molded contour without having to cool the composite roof liner panel 10. Without the use of a thermoset binder in the wood and polyolefin fiber sheet, the composite roof liner panel 10 is placed in a cooling fixture immediately after the molding cycle to hold the roof liner panel 10 is its desired shape until the composite roof liner panel 10 cools. The thermoset binder in the sheet 16 also improves the overall strength of the composite roof liner panel 10.

While not shown, the wood and polyolefin fiber sheet and the corrugated paperboard medium 18 will normally be bonded together in a conventional heated corrugation machine prior to introduction into the mold press 20 to facilitate the handling of the sheet and corrugated medium prior to the molding operation. However, during the molding of the laminate into the composite structure, e.g. roof liner panel 10, the melted polyolefin material formed by the melting of the polyolefin fibers in the wood and polyolefin fiber sheet firmly and permanently bonds the wood fiber filled polyolefin sheet 16 formed during the molding operation to the corrugated medium 18 to form the single faced corrugated backing sheet 12 of the composite structure.

As shown in FIGS. 3 and 4, the surface 28 of the male mold member 22 is inclined so that the spacing between the male and female molding surfaces 28 and 30 varies when the mold is closed. Thus, the thickness and density of the fibrous insulation layer 14 varies from one area of the roof liner panel to another creating "pillowed" areas for better sound absorption in selected areas of the roof liner 10. Since the single faced corrugated backing sheet 12 formed during the molding process, provides the structural strength for the self-supporting roof liner panel 10, the pillowed areas can be incorporated into the roof liner panel without adversely affecting the physical properties of the roof liner panel.

In another embodiment of the present invention, a second sheet is substituted for the fibrous insulation layer 14. The second sheet can comprise various materials, but preferably, the second sheet is a wood and polyolefin fiber sheet with a thermoset binder, a latex emulsion binder or a thermoset and latex emulsion binder blend of the type described above in connection with first the wood and polyolefin fiber sheet used to form sheet 16. While the first wood and polyolefin fiber sheet, the second sheet and the corrugated medium 18 can be separately placed in the mold for the molding operation, preferably, the first wood and polyolefin fiber sheet, the second sheet and the corrugated medium 18 are bonded together into a double faced corrugated sheet prior to the molding operation in a conventional corrugation machine.

In the molding operation, the double-faced corrugated sheet is placed in placed in a mold, such as shown in FIGS. 3 and 4. The double-faced corrugated medium is compressed and heated between the upper and lower mold members to conform to the contours of the mold surface. The heat (between 350° and 570° Fahrenheit) of the mold causes the polyolefin fibers in the first sheet and, where a similar or identical wood and polyolefin fiber sheet is used for the second sheet, the polyolefin fibers of the second sheet to melt and flow around the wood fibers, as the sheets conform to the configuration of the mold surface to transform both wood and polyolefin fiber sheets into vapor impervious, wood fiber filled polyolefin sheets (like sheet 16). In addition the polyolefin material also acts as an adhesive to firmly bond the corrugated paperboard medium to the sheet to form a self-supporting composite part, such as a roof liner panel, with good structural strength. The use of the thermoset binder, the latex emulsion binder or the thermoset binder and latex emulsion binder blend in these facing sheets serves the same function as when used in the wood and polyolefin fiber sheet used to form sheet 16.

Since the first facing sheet and the corrugated medium can provide the structural strength for the composite part, it is contemplated that the second facing sheet could comprise a different material, such as a synthetic fiber or cotton or other natural fiber material. A conventional adhesive would be used to bond the second sheet to the second major face of the corrugated medium.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of forming a self-supporting composite structure comprising the steps of:

providing a laminate comprising a first facing layer having between 50% and 60% by weight wood fibers having an average diameter between 20 and 60 microns and average lengths between 50 and 150 microns, between 25% and 40% by weight polyolefin fibers having an average diameter between 1 and 8 microns and average lengths between 50 and 150 microns, and between 5% and 25% by weight thermoset binder to increase the tensile strength of said first facing sheet prior to molding; a second facing layer; and a corrugated paperboard medium intermediate said first facing layer and said second facing layer; said second facing layer having an adhesive means for bonding said second facing layer to said corrugated medium; and molding said laminate under pressure in a mold at a temperature of at least 350° Fahrenheit to cause said polyolefin fibers in said first facing layer to melt and flow around said wood fibers and transform said first facing layer into a vapor impervious, wood fiber filled polyolefin sheet that conforms to a molding surface of the mold and is adhesively bonded by said polyolefin of said wood fiber filled polyolefin sheet to a first major surface of said corrugated medium; to cause said thermoset binder to set whereby said wood fiber filled polyolefin sheet retains its shape upon removal from said mold without cooling; and to cause said second facing layer to conform to said molding surface of said mold and be adhesively bonded to a second major surface of said corrugated medium.

2. The method of forming a self supporting composite structure according to claim 1, wherein:

said second facing layer is a uncured phenolic resin impregnated glass fiber insulation and said adhesive means is said uncured phenolic resin which is cured during said molding step to set the shape of said second facing layer and to adhesively bond said second facing layer to said second major surface of said corrugated medium.

3. The method of forming a self-supporting composite structure according to claim 1, wherein:

said second facing layer is a second wood fiber and polyolefin fiber sheet and said adhesive means comprises melted polyolefin fibers of said second wood fiber and polyolefin sheet which are melted during the molding step to set the shape of said second facing layer and adhesively bond said second facing layer to said second major surface of said corrugated medium.

4. The method of forming a self-supporting composite structure according to claim 1, wherein: said polyolefin fibers are polypropylene fibers.

5. The method of forming a self-supporting composite structure according to claim 1, wherein:

said binder is a blend of said thermoset binder and a latex emulsion binder with said latex emulsion binder providing improved tensile strength to said sheet during said molding step.

6. The method of forming a self-supporting composite structure according to claim 5, wherein: said second facing layer is an uncured phenolic resin impregnated glass fiber insulation and said adhesive means is said uncured phenolic resin which is cured during said molding step to set the shape of said second facing layer and to adhesively bond said second facing layer to said second major surface of said corrugated medium.

7. The method of forming a self-supporting composite structure according to claim 5, wherein: said second facing layer is a second wood fiber and polyolefin fiber sheet and said adhesive means comprises melted polyolefin fibers of said second wood fiber and polyolefin fiber sheet which are melted during the molding step to set the shape of said second facing layer and adhesively bond said second facing layer to said second major surface of said corrugated medium.

8. The method of forming a self-supporting composite structure according to claim 5, wherein:

said polyolefin fibers are polypropylene fibers.

9. A method of forming a self-supporting composite structure comprising the steps of:

providing a laminate comprising a first facing layer having between 50% and 60% by weight wood fibers having an average diameter between 20 and 60 microns and average lengths between 50 and 150 microns, between 25% and 40% by weight polyolefin fibers having an average diameter between 1 and 8 microns and average lengths between 50 and 150 microns, and between 5% and 25% by weight latex emulsion binder to increase the tensile strength of said first facing layer; a second facing layer; and a corrugated paperboard medium intermediate said first facing layer and said second facing layer; said second facing layer having an adhesive means for bonding said second facing layer to said corrugated medium; and molding said laminate under pressure in a mold at a temperature of at least 350° Fahrenheit to cause said polyolefin fibers in said first facing layer to melt and flow around said wood fibers and transform said first facing layer into a vapor impervious, wood fiber filled polyolefin sheet that conforms to a molding surface of the mold and is adhesively bonded by said polyolefin of said wood fiber filled polyolefin sheet to a first major surface of said corrugated medium; to cause said latex binder to cure; and to cause said second facing layer to conform to said molding surface of said mold and be adhesively bonded to a second major surface of said corrugated medium.

10. The method of forming a self-supporting composite structure according to claim 9, wherein:

said second facing layer is an uncured phenolic resin impregnated glass fiber insulation and said adhesive means is said uncured phenolic resin which is cured during said molding step to set the shape of said second facing layer and to adhesively bond said second facing layer to said second major surface of said corrugated medium.

11. The method of forming a self-supporting composite structure according to claim 9, wherein:

said second facing layer is a second wood fiber and polyolefin fiber sheet and said adhesive means comprises melted polyolefin fibers of said second wood fiber and polyolefin fiber sheet which are melted during the molding step to set the shape of said second facing layer and adhesively bond said second facing layer to said second major surface of said corrugated medium.

12. The method of forming a self-supporting composite structure according to claim 9, wherein:

said polyolefin fibers are polypropylene fibers.

13. The method of forming a self-supporting composite structure according to claim 9, including:

forming a single-faced corrugated medium of said first facing layer and said corrugated paperboard medium prior to molding said laminate in said mold.

14. A method of forming a self-supporting composite structure comprising the steps of:

providing a laminate comprising a first facing layer having between 60% and 75% by weight wood fibers having an average diameter between 20 and 60 microns and average lengths between 50 and 150 microns, and between 25% and 40% by weight polyolefin fibers having an average diameter between 1 and 8 microns and average lengths between 50 and 150 microns; a second facing layer; and a corrugated paperboard medium intermediate said first facing layer and said second facing layer; said second facing layer having an adhesive means for bonding said second facing layer to said corrugated medium; and molding said laminate under pressure in a mold at a temperature of at least 350° Fahrenheit to cause said polyolefin fibers in said first facing layer to melt and flow around said wood fibers and transform said first facing layer into a vapor impervious, wood fiber filled polyolefin sheet that conforms to a molding surface of the mold and is adhesively bonded by said polyolefin of said wood fiber filled polyolefin sheet to a first major surface of said corrugated medium and to cause said second facing layer to conform to said molding surface of said mold and be adhesively bonded to a second major surface of said corrugated medium.

* * * * *